United States Patent
Tsutsuguchi et al.

[11] Patent Number: 6,104,412
[45] Date of Patent: Aug. 15, 2000

[54] METHOD FOR GENERATING ANIMATIONS OF A MULTI-ARTICULATED STRUCTURE, RECORDING MEDIUM HAVING RECORDED THEREON THE SAME AND ANIMATION GENERATING APPARATUS USING THE SAME

[75] Inventors: Ken Tsutsuguchi, Yokosuka; Yasuhito Suenaga, Nagoya; Yasuhiko Watanabe, Yokohama; Noboru Sonehara, Zushi, all of Japan

[73] Assignee: Nippon Telegraph and Telephone Corporation, Toyko, Japan

[21] Appl. No.: 08/912,863

[22] Filed: Aug. 19, 1997

[30] Foreign Application Priority Data

Aug. 21, 1996 [JP] Japan .................... 8-219972

[51] Int. Cl.⁷ .................................................. G06F 3/10
[52] U.S. Cl. .................................... 345/473; 345/474
[58] Field of Search .............................. 345/418, 420, 345/473, 474

[56] References Cited

U.S. PATENT DOCUMENTS

| | | | |
|---|---|---|---|
| 5,754,189 | 5/1998 | Doi et al. | 345/474 |
| 5,767,861 | 6/1998 | Kimura | 345/473 |
| 5,847,716 | 12/1998 | Hashimoto | 345/473 |

FOREIGN PATENT DOCUMENTS

| | | |
|---|---|---|
| 0 466 154 | 1/1992 | European Pat. Off. . |
| 0 520 099 | 12/1992 | European Pat. Off. . |
| 0 712 097 | 11/1994 | European Pat. Off. . |

OTHER PUBLICATIONS

Perlin, Ken, "Real Time Responsive Animation with Personality," *IEEE Transactions on Visualization and Computer Graphics*, vol. 1, No. 1, Mar. 1995, New York, New York, pp. 5–15.

*Primary Examiner*—Phu K. Nguyen
*Assistant Examiner*—Cliff N. Vo
*Attorney, Agent, or Firm*—Pollock, Vande Sande & Amernick

[57] ABSTRACT

The present invention offers a method for generating animations of a multi-articulated structure, a recording medium with the method recorded therein and an animation generating apparatus using the method. Motions of rigid sticks which approximate the upper arm connected to the shoulder joint and the lower arm connected by the elbow joint to the upper arm are modeled, by an interpolation scheme and/or equations of motion based on laws of physics, as temporal changes in angular positions in their respective constraint planes and the generated results are combined and output.

37 Claims, 7 Drawing Sheets

METHOD FOR GENERATING ANIMATIONS OF A MULTI-ARTICULATED STRUCTURE, RECORDING MEDIUM HAVING RECORDED THEREON THE SAME AND ANIMATION GENERATING APPARATUS USING THE SAME

BACKGROUND OF THE INVENTION

The present invention relates to a method for generating animations of a human figure modeled by a multi-articulated structure in computer graphics (CG) and, more particularly, to a method for generating animations of shoulder rotation and arm swing of a human figure modeled by a multi-articulate d structure constructed by rigid bars or sticks connected or joined by joints, a recording medium having recorded thereon the method and an animation generating apparatus using the method.

In conventional methods for generating human figure animations, it is customary to model human arms, legs, body, head and so forth as multi-articulated structures constructed from rigid links coupled by joints just like a robot arm. In this instance, the position and direction of each link are represented by polar or cylindrical coordinates parameters or Euler angles. In a D-H method (Denavit-Hartenberg method), a joint-link parameter of an i-th link in a multi-articulated structure constructed by plural links sequentially coupled by joints is represented by $Joint_i=[a_i, \alpha_i, d_i, \theta_i]$ to express link motions (K. S. Fu. et al, "ROBOTICS:Control, Sending, Vision, and Intelligence," McGraw-Hill, 1987). In either case, the method for generating animations of various parts of the human body by the use of such parameters utilizes (1) an interpolation scheme that employs linear or elementary functions, (2) a scheme that formulates an equation of motion and performs numerical calculations to satisfy initial and final conditions, or (3) a scheme that uses motion data obtained by extracting feature parameters of joint positions in the human body from an image taken by a video camera or measuring positional changes of the human body by a magnetic or electric sensor.

The creation of animations through the use of these parameters requires skill and is low in operation efficiency because it is hard to judge how these parameters directly (visually) contribute to the magnitude or direction of, for instance, arm or leg motions, or because the individual parameters cannot directly be controlled, or because it is difficult to control a motion generating method for each parameter.

SUMMARY OF THE INVENTION

An object of the present invention is to provide an animation generating method according to which, in the generation of an animation of a human figure modeled by a multi-articulated structure using rigid sticks joined by joints, parameters contributing to the motions of respective rigid sticks are easy to identify and individually controllable and motion generating schemes for the respective parameters can freely be selected or combined.

Another object of the present invention is to provide an animation generating method using the above method and a recording medium with the method recorded thereon.

The animation generating method according to the present invention models the human body including shoulders and arms by a multi-articulated structure made up of plural rigid sticks connected by joints and generates the modeled human figure motions. This method comprises the following steps:

(a) defining constraint planes in which the modeled rigid sticks of the arms are allowed to move about the joints connecting them;

(b) determining parameters that define angular positions of the modeled rigid sticks of the arms in the constraint planes, respectively, and creating motion models of the rigid sticks each corresponding to one of the parameters; and (c) generating motions of the rigid sticks by calculating temporal variations of the parameters.

The animation generating apparatus according to the present invention models the human body including shoulders and arms by a multi-articulated structure made up of plural rigid sticks connected by joints and generates human figure animations. This apparatus comprises:

configuration modeling means for disposing the rigid sticks of the arms in respective constraint planes;

shoulder position calculating means for calculating the positions of the shoulder joints;

motion modeling means for determining motion models representing motions of the rigid sticks of the arms; and arm angle calculating means for calculating angular positions indicating the orientations of the arms at a given point of time in accordance with the motion models.

DESCRIPTION OF THE PREFERRED EMBODIMENTS

Figure 1:
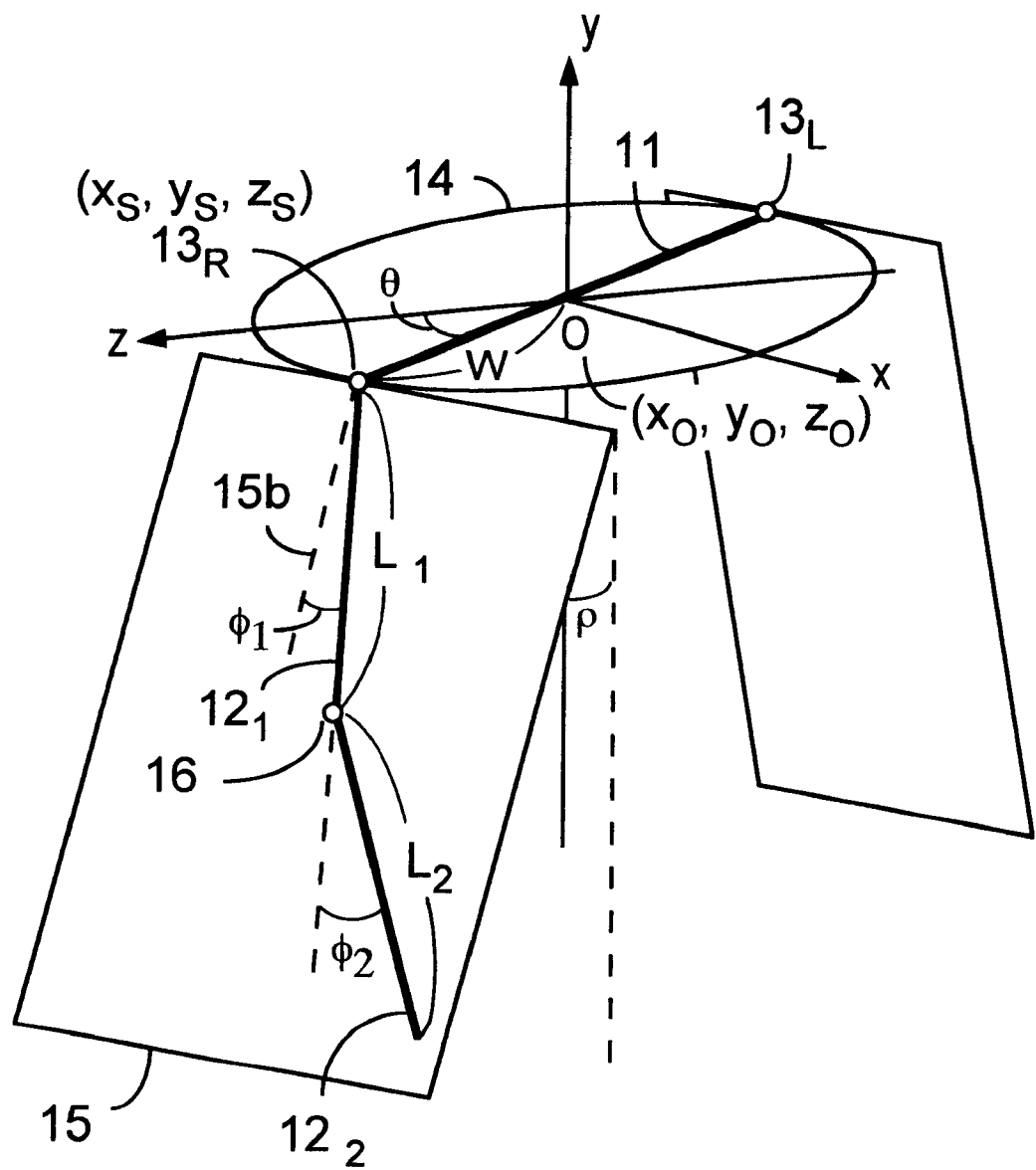
FIG. 1 is a diagram showing an example of a multi-articulated structure model, for explaining the principles of the present invention.

FIG. 1 schematically illustrates a multi-articulated structure and motions of its respective parts, for explaining the principles of the present invention. According to the principles of the present invention, the human body is modeled by a multi-articulated structure including both shoulders and both arms formed by linking rigid sticks with joints, the arms each linked to one of the shoulder joints are allowed to rotate in a constraint plane passing through the link, and the position of the arm is defined by its angle to a reference line in the constraint plane. Hence, a parameter that defines the position of the arm is only an angle, and since the angle directly represents the angular position of the arm in the animation, motions of respective parts of the multi- articulated structure can easily be set in the production of the animation and angular position control is simple.

In FIG. 1, let it be assumed that a rigid stick 11 of a length 2W joining left and right shoulder joints $13_L$ nd $13_R$ is a modeled version of both shoulders of the human body and that the center O of the rigid stick 11 is set at a reference position $(x_0, y_0, z_0)$ in a coordinate system (x,y,z). The normal of a circle 14 of rotation of the rigid stick 11 on the y axis (a vertical axis) passing through the center O of the rigid stick 11 vertically thereto represents the axial direction of the human body (the direction of the backbone). In the FIG. 1 example, the circle 14 sits in an x-z plane, but as will be described later on, the plane of the circle 14 need not always to cross the y axis at right angles thereto. The right shoulder joint $13_R$ has rotatably connected thereto one end of the right upper arm $12_1$ modeled by a rigid stick, to the other end of which is rotatably connected the right lower arm $12_2$ similarly modeled by a rigid stick. The coordinates $(x_s, y_s, z_s)$ of one end of the rigid stick 11 (i.e. the shoulder joint $13_R$) in the 3D space are unequivocally determined by the following equation, based on an angle θ between the projection of the rigid stick 11 to the x-z plane and the z axis and the shoulder width 2W.

$$X_s = x_0 + W\sin\theta$$

$$Y_s = Y_0$$

$$z_s = z_0 + W\cos\theta$$

Suppose that the motion of the upper arm $12_1$ of a length $L_1$ is constrained in a plane 15 containing a tangent 15a to the circle 14 at the upper end of the upper arm $12_1$, that is, at the shoulder joint $13_R$. This plane will hereinafter referred to as a constraint plane. In other words, the upper arm $12_1$ is rotatable about the shoulder joint $13_R$ in the constraint plane 15. The angular position of the upper arm $12_1$ is defined by an angle $\phi_1$ between the upper arm 121 and a reference line 15b that is a straight line along which a plane containing the rigid stick 11 and the y axis crosses the constraint plane 15. An angle ρ that the constraint plane 15 forms with the y axis represents a tilt angle of the upper arm 121 from the body and an angle $\rho_1$ of the upper arm $12_1$ to the reference line 15b the angular position of a swing of the upper arm $12_1$ from the body in the front-to-back direction. Similar angular positions of the right arm are also defined though not shown in FIG. 1.

In the example of FIG. 1, the motion of the lower arm $12_2$ of a length $L_2$ connected to the lower end of the upper arm $12_1$ (that is, to the elbow joint 16) is also constrained in the same constraint plane 15 as that of the upper arm 121 and its angular position is defined by an angle $\phi_2$ that the lower arm $12_2$ forms with the upper arm $12_1$. The parameter $\phi_2$ representative of the angular position of the lower arm $12_2$ is also a parameter that directly indicates the attitude of the lower arm $12_2$ of the human figure model.

In contrast to the above, the prior art uses the coordinates (x,y,z) to represent the positions of feature points of a human figure animation (for example, an eye, a nose, tiptoe, an elbow, etc.) and generates an animation by expressing their motions using a linear interpolation or equation of motion, but in the case of using the coordinates (x,y,z) as parameters, it is no easy task for an observer to comprehend or grasp the attitude of the 3D animation. Also in the case of using cylindrical or polar coordinates, the angle parameters are not easy to grasp because the parameter representation does not match the actual human instinctive control. That is, since it is hard to learn which motion each parameter contributes to, it is no easy task to instinctively determine, for example, movement limits of respective parts of the human figure for generating an animation.

That is, the parameters ρ, $\phi_1$ and $\phi_2$, which define the arm 12 to which the present invention is applied, are parameters that enable the observer to directly understand the attitude of the human figure model and it is clear the motion to which each parameter contributes; therefore, these parameters are easy to use for governing the generation of human figure animations. Hence, the present invention has its feature in that motions of human arms are represented by changes in the arm positions defined by angle parameters in the constraint plane as referred to above.

In this way, according to the present invention, the position of the arm of the human figure is defined by the angle parameters in the constraint plane and the arm motion or swing is expressed using temporal variations of the angle parameters as described below.

The modeling of the arm motion through utilization of the angle parameters can be done, for example, by (1) interpolating between two boundary conditions, (2) using an equation of motion that satisfies two boundary conditions, and (3) using measured data.

With the motion modeling method by linear interpolation, letting the angles $\phi_1$ and $\phi_2$ be represented by generalized coordinates q and the coordinate at time t by q(t), the coordinates at time $t_1$ and $t_2$ by $q_0 = q(t_0)$ and $q_1 = q(t_1)$, respectively, the angular positions $\phi_1(t)$ and $\phi_2(t)$ of the upper and lower arms at time t by the simplest uniform-angular-velocity linear interpolation are given by the following equations:

$$\phi_1(t) = \frac{\phi_1(t_1) - \phi_1(t_0)}{t_1 - t_0} t + \phi_1(t_0) \tag{1}$$

$$\phi_2(t) = \frac{\phi_2(t_1) - \phi_2(t_0)}{t_1 - t_0} t + \phi_2(t_0) \tag{2}$$

where $t_0 \leq t \leq t_1$ and $-\pi < \phi_1 < \pi$, $0 < \phi_2 < \pi$. This linear interpolation is a motion modeling scheme that approximates the angle parameters $\phi_1$ and $\phi_2$, regarding them as linear variables of time.

An example of a nonlinear interpolation for modeling a motion is a sine interpolation scheme. Approximating the human arm swing by sine functions so that the angular velocity of the arm swing becomes zero at its both swing limits, the angular position of the arm can be expressed by time variables as follows:

$$\frac{d\phi_1}{dt} = \omega_1(t) = a\sin\frac{\pi(t - t_0)}{t_1 - t_0} \tag{3}$$

$$\frac{d\phi_2}{dt} = \omega_2(t) = b\sin\frac{\pi(t - t_0)}{t_1 - t_0} \tag{4}$$

where:

$$a = \frac{\pi\{\phi_1(t_1) - \phi_1(t_0)\}}{2(t_1 - t_0)} \tag{5}$$

$$b = \frac{\pi\{\phi_2(t_1) - \phi_2(t_0)\}}{2(t_1 - t_0)}$$

As an example of modeling by an equation of motion according to the law of physics, a motion of each part can be expressed by the following Lagrange's equation of motion $$\frac{d}{dt}\left[\frac{\partial L}{\partial \dot{q}}\right] - \frac{\partial L}{\partial q} = Fq \tag{6}$$

where L is the Lagrangian of this system, q generalized coordinates of this system and Fq a generalized force concerning q.

Figure 2:
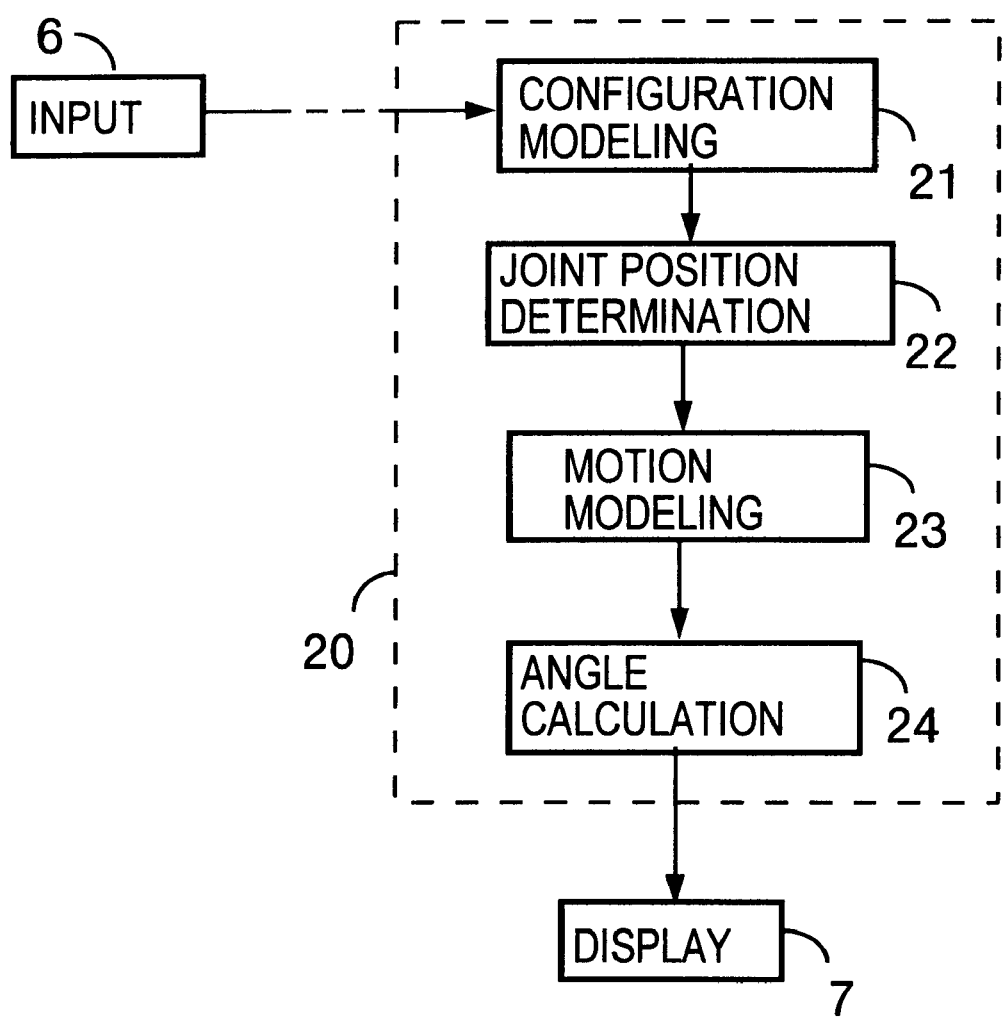
FIG. 2 is a block diagram illustrating an embodiment of the animation generating apparatus according to the present invention.

FIG. 2 illustrates in block form the configuration of the multi-articulated structure animation generating apparatus according to the present invention, indicated generally by 20. The animation generating apparatus 20 comprises a configuration modeling part 21, a joint position determination part 22, a motion modeling part 23 and an angle calculation part 24. The configuration modeling part 21 is connected to an input part 6 that inputs information necessary for representing motions of the arm 12. The angle calculation part 24 outputs its calculated angular position of each rigid stick and provides it to a display part 7, which projects a 3D multi-articulated structure constructed by rigid sticks onto a 2D plane, thereby displaying an animation of the projected model.

Any of the above-mentioned methods can be used for modeling of the arm motion. The information necessary for the generation of the animation of the arm 12, for example, the coordinates $(x_s, y_s, z_s)$ of the shoulder, the length $L_1$ of the upper arm $12_1$, the length $L_2$ of the lower arm $12_2$, initial angular positions $\phi_1$ and $\phi_2$ of the upper and lower arms and initial angular velocities at the initial angular positions, are input into the configuration modeling part 21. In the case of using the equation of motion, the mass of each of the upper and lower arms is also input.

The configuration modeling part 21 models the arm 12 by approximating the arm structure with a physical pendulum formed as a rigid body, determines various physical quantities (the lengths, mass, centroids, maximum expansion angle, maximum bend angle and moment of inertia of the upper and lower arms, and outputs these arm models and its determined physical quantities.

The joint position determination part 22 calculates the position of the shoulder joint $13_R$ that serves as the fulcrum of the rigid physical pendulum of the configuration modeling part 21. The position of the shoulder joint can be calculated by any methods as long as they regard it as a point in a 3D space and compute its coordinate value and velocity and acceleration.

Based on the joint position determined by the joint position determination part 22, the motion modeling part 23 creates, following the designated modeling scheme, a motion model by generating an interpolation formula or equation of motion representing the arm-motion state through the use of the configuration model and physical quantities output from the configuration modeling part 21.

Next, the arm angle calculating part 24 calculates the angle representative of the configuration of the arm at a certain time t based on the equation of the motion model determined by the motion modeling part 23. In this instance, however, the angular position may be computed using plural motion models as described later on.

Figure 3:
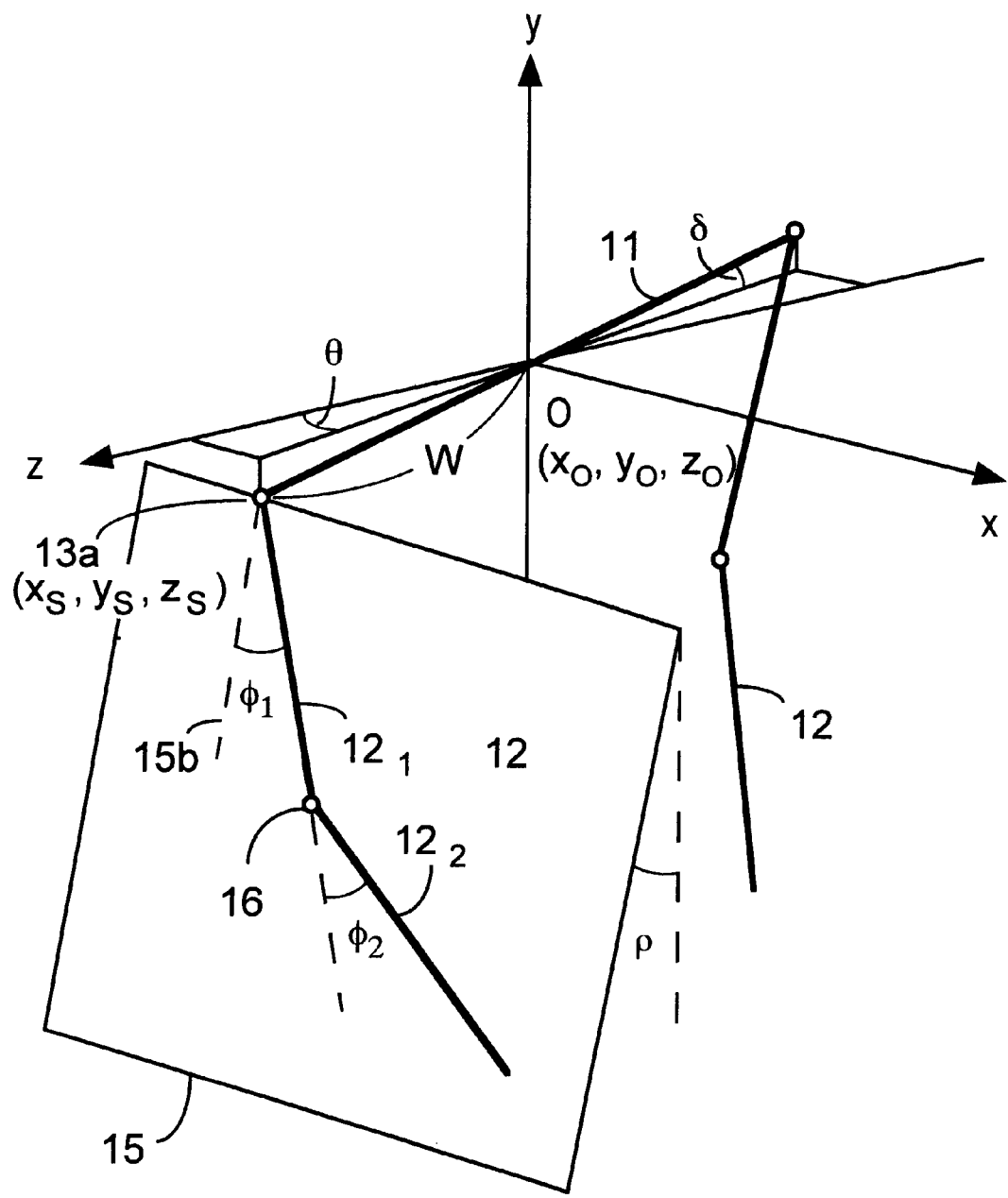
FIG. 3 is a diagram showing a model in the case where parameters for shoulders in the multi-articulated structure model of FIG. 1 are increased.

While FIG. 1 shows a configuration model in which the rigid stick 11 between the both shoulder joints is rotatable on the y axis within a predetermined angular range and the coordinate positions $(x_s, y_s, z_s)$ of each shoulder joint is defined by the angle $\theta$ of the shoulder about the y axis and the half shoulder width W, the rigid stick between the shoulder joints may be made rotatable on the x axis as well over a predetermined angular range with a view to creating a more realistic representation of the motion of the human figure model. FIG. 3 shows a configuration model in such an instance. In this example, the rigid stick 11 is shown to have turned an angle $\theta$ about the y axis and an angle $\delta$ about the x axis. Hence, the coordinates $(x_s, y_s, z_s)$ of the shoulder joint is defined by the following equations using the angles $\theta$ and $\delta$ and the half shoulder width W.

$$x_s = x_0 + W\cos\delta\sin\theta$$

$$y_s = y_0 + W\sin\delta$$

$$z_s = z_0 + W\cos\delta\cos\theta$$

When the rigid stick 11 between the both shoulder joints is turned on the vertical coordinate axis y, centrifugal force is exerted on the left and right arms 12 outwardly thereof. The angle r of the constraint plane 15 to the vertical coordinate axis ρ may be changed according to the centrifugal force. In the present invention, the motions of the arms $12_1$ and $12_2$ are defined by the angular positions $\phi_1$ and $\phi_2$ in the constraint plane 15 with respect to such given shoulder joint coordinates $(x_s, y_s, z_s)$.

In the configuration models of FIGS. 1 and 3, the upper and lower arms $12_1$ and $12_2$ are shown to be movable in the same constraint plane 15, but in order to represent the motion of the arm model more faithfully to the actual arm motion, it is possible to divide the constraint plane 15, by a straight line passing through the elbow joint, into two independent constraint planes $15_1$ and $15_2$ for the upper and lower arms $12_1$ and $12_2$, respectively. The constraint plane $15_2$ containing the lower arm $12_2$ is made rotatable over a predetermined range of angles about the upper arm $12_1$. Letting the angle of rotation of the constraint plane $15_2$ be represented by $\xi$, the angular position of the lower arm $12_2$ in the constraint plane $15_2$ can be defined by the angles $\phi_2$ and $\xi$; hence, once the coordinates $(x_E, y_E, z_E)$ of the elbow joint 16 are defined, the position of the lower arm $12_2$ can also easily be defined using these parameters.

Figure 5:
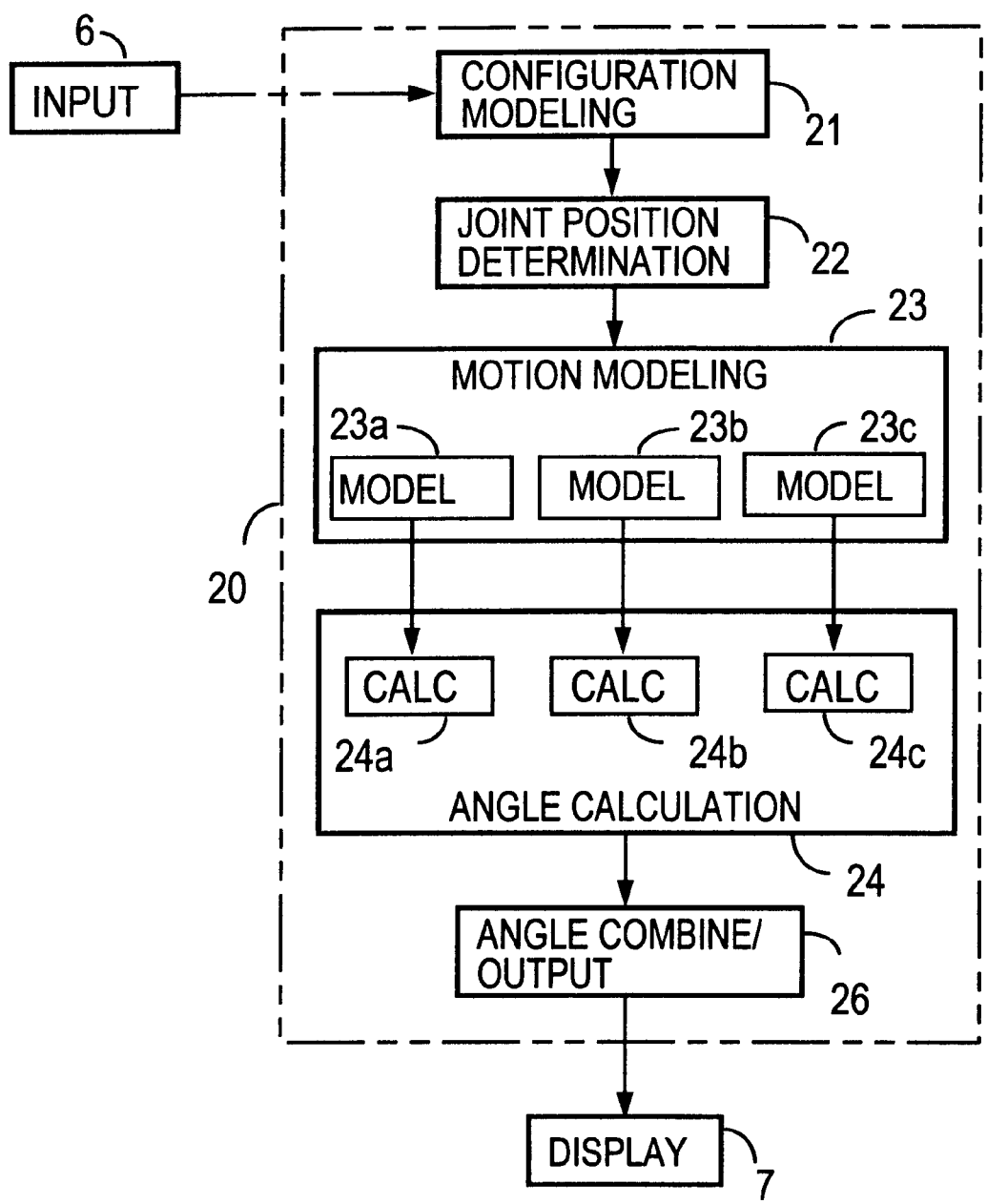
FIG. 5 is a block diagram illustrating another embodiment of the animation generating apparatus according to the present invention.

In the FIG. 2 embodiment the arm angle calculation part 24 represents motions of respective parts based on one motion modeling scheme selected by the motion modeling part 23, the interpolation method has a defect that the motions becomes uniform and monotonous in the case of generating animations that do not primarily aim at motions accompanying the human walking, such as the arm motion or the like. In the case of representing motions based on the equation of motion, the number of degrees of freedom increases according to the model building method, resulting in an increase in the computational complexity. Further, since the method for generating animations from image data of the human body in motion by a video camera or position detected data by a magnetic sensor is difficult of application to various motion scenes, it is necessary to acquire a wide variety of motion data. In FIG. 5 there is illustrated in block form an embodiment of the invention that overcomes such defects.

This embodiment is identical in basic configuration with the FIG. 2 embodiment but differs from the latter in that the motion modeling part 23 is provided with plural (three in this example) kinds of modeling section 23a, 23b and 23c for modeling the motion state of the arm 12 by different methods.

Another point of difference is that the arm angle calculation part 24 has calculation sections 24a, 24b and 24c respectively corresponding to the modeling sections 23a, 23b and 23c of the motion modeling part 23. Additionally, this embodiment has an angle combine/output part 26 that performs weighted combining of calculated angles. This embodiment will be described below.

As in the case of FIG. 2, the configuration modeling part is supplied with input data from the input part 6, such as sizes, mass, shapes and boundary conditions (movable ranges of respective parts of a multi-articulated model of the human body, and uses the data to dispose respective parts of a structure formed by rigid sticks linked by joints, an arm model in this case. While in FIG. 4 the angles $\phi_1$ and $\phi_2$ are chosen so that the counterclockwise direction about the rigid stick 11 is positive, any coordinate system can be used as long as the orientation or configuration of the arm 12 can be represented unequivocally.

Next, the point position determination part 22 computes the positions of the shoulder joints $13_R$ and $13_L$. The model of the shoulder is not limited specifically to that shown in FIGS. 3 or 4 but may be others as long as the coordinates $(x_s, y_s, z_s)$ of the should joint can be calculated.

Figure 4:
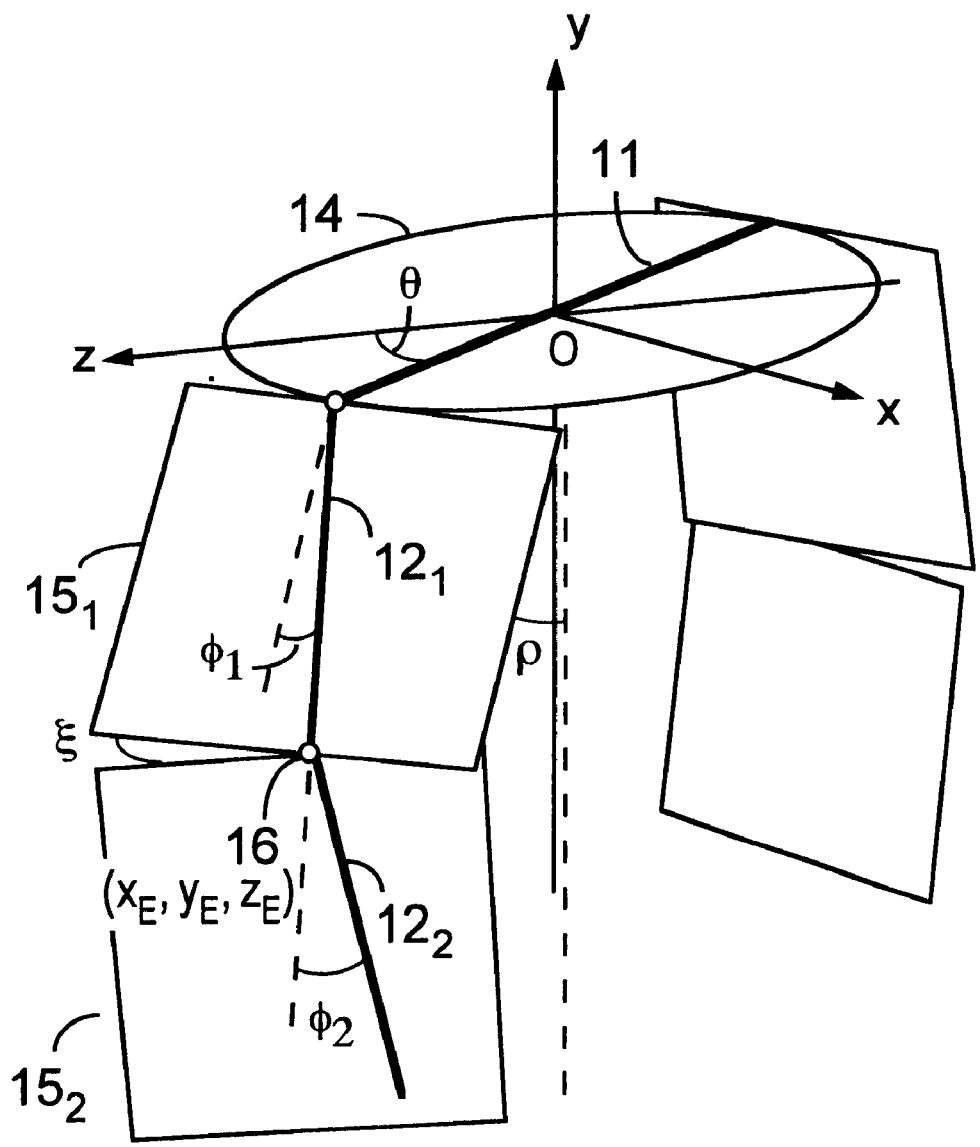
FIG. 4 is a diagram showing a multi-articulated structure model in the case where upper and lower arms lie in different constraint planes in FIG. 1.

The motion modeling part 23 models the motion state of the arm model in the system of FIG. 4 by three different methods in this example. That is, based on the arm model and physical quantities determined in the configuration modeling part 21, the motion modeling part 23 determines modeling by equations of motion or modeling by equations of interpolation and outputs the models.

Figure 6:
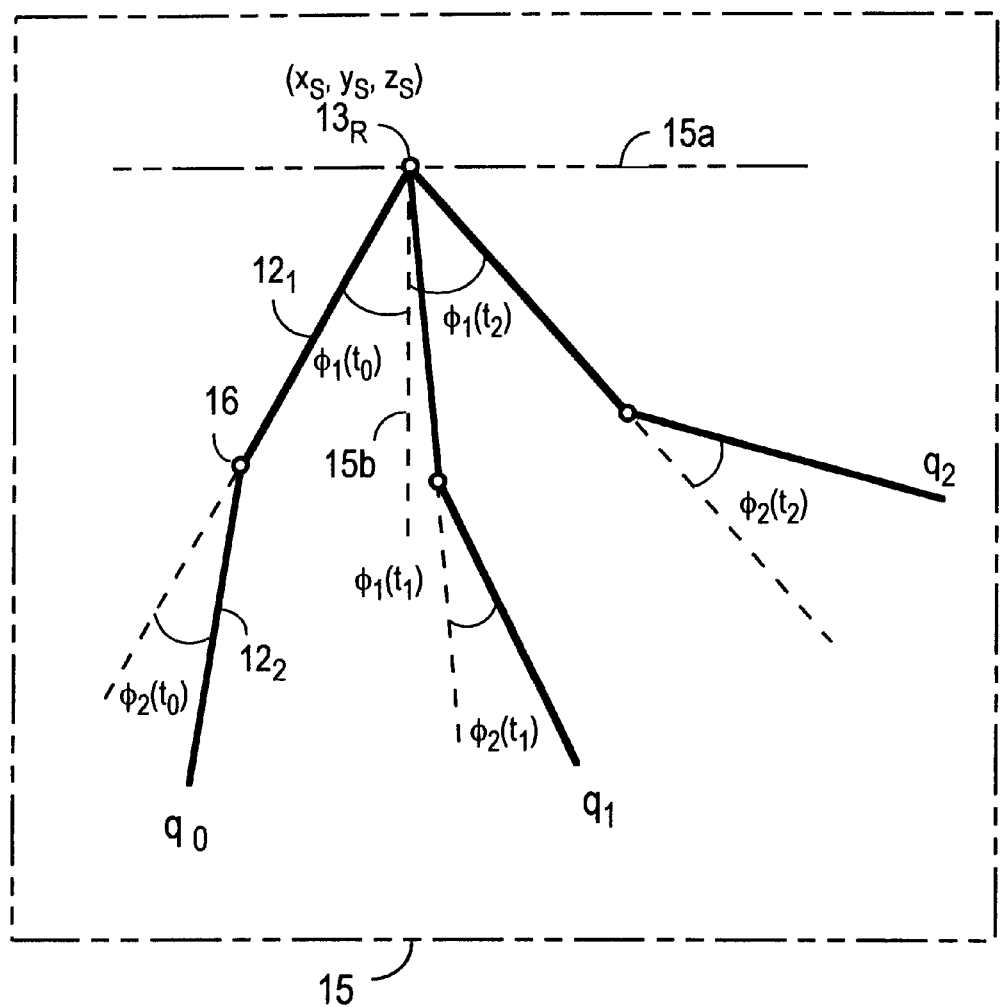
FIG. 6 is a diagram for explaining the modeling of motions of upper and lower arms in the same constraint plane.

Let it be assumed, for example, that the coordinate system used is a system in which the arm 12 assumes a state $q_0=(t_0)$ at time $t_0$, a state $q_1=q(t_1)$ at time $t_1$ and a state $q_2=q(t_2)$ at time $t_2$ as shown in one constraint plane 15 in FIG. 6 and that constraints for the angles $\phi_1$ and $\phi_2$ are, for example, $-\pi/2 < \phi_1 < \pi/2$ and $0 < \phi_2 < \pi$.

In the motion modeling section 23a, the motions between the states $q_0$, $q_1$ and $q_2$ are assumed to be linear motions, that is, the motion from the state $q(t_0)$ to $q(t_1)$ and from $q(t_1)$ to $q(t_2)$ are regarded as constant-speed motion states, and an equation of the motion state, which represents the angular position and/or angular velocity at given time t, is formulated using the linear interpolation method.

In the motion modeling section 23b, the motion states between the states $q_0$, $q_1$ and $q_3$ are assumed to be states of motion at a velocity approximated by a sine curve, for instance, and an equation of the motion state, which represents the angular position and/or angular velocity at given time 1, is formulated using the sine interpolation method.

In the motion modeling section 23c, these states $q_0$, $q_1$ and $q_2$ are assumed to be motion states that obey laws of physics, and they are defined as motions that result from the aforementioned Lagrange s equation of motion (6), where q is generalized coordinates $(\phi_1, \phi_2)$ of this system and Fq a generalized force concerning q. In this instance, the generalized force may be any force as long as the system can represent the states $q_0$, $q_1$ and $q_2$.

Then, the angle of the arm 12 is calculated in the arm angle calculation part 24. In the calculating section 24a, angles $\phi^a_1(t)$ and $\phi^a_2(t)$ of the arm 12 at time t between $t_0$ and $t_2$ are calculated based on the motion state determined by the motion modeling section 23a. In the case of using a discrete time series $t_0, t_0+\Delta t, t_0+2\Delta t, \ldots, t_2$, angles $\phi^a_1(t^k)$ and $\phi^a_2(t^k)$ are calculated with $t^k=t_0+\Delta t$, where $0 \leq k \leq (t_2-t_0)/\Delta t$.

In the calculating section 24b, angles $\phi^b 1(t)$ and $\phi^b_2(t)$ or $\phi^b_1(t^k)$ and $\phi^b_2(t^k)$ of the arm 12 are calculated based on the motion state determined by the motion modeling section 23b.

In the calculating section 24c, angles $\phi^c_1(t)$ and $\phi^c_2(t)$ or $\phi^c_1(t^k)$ and $\phi^c_2(t^k)$ of the arm 12 are calculated based on the motion state determined by the motion modeling section 23c.

The angle combine/output part 26 performs weighted combining of angles $\phi^j_i(t)$ or $\phi^j_i(t^k)$ (where i=1,2 and j=a,b,c) output from the arm angle calculation part 24. The angle is expressed by the following equation using, as weights, real numbers $\alpha$, $\beta$ and $\gamma$ such that $\alpha+\beta+\gamma=1$, where $0 < [\alpha, \beta, \gamma] < 1$.

$$\phi_i(t) = \alpha\phi^a_i(t) + \beta\phi^b_i(t) + \gamma\phi^c_i(t) \quad i=1,2 \qquad (7)$$

or $$\phi_i(t^k) = \alpha\phi^a_i(t^k) + \beta\phi^b_i(t^k) + \gamma\phi^c_i(t^k), \quad i=1,2$$

$$9 \leq K \leq (t2-t0)/\Delta t \qquad (8)$$

When any one of the weights $\alpha$, $\beta$ and $\gamma$ is 1 and the others 0s, the same results as in the FIG. 2 embodiment are obtained.

In the combining of motion models, it is also possible to combine output values of angular velocities by such a linear combination as Eq. (7) or (8) in each motion state and then calculate the joint angles, instead of such angles as mentioned above. The angular positions $\phi_1$ and $\phi_2$ of the upper and lower arms $12_1$ and $12_2$ at each point in time t thus obtained are provided to the display part 7. As a result, a variety of motion states of the arm 12 close to natural arm motions can be generated with a small computational quantity.

In this example, motions of the arm 12 can efficiently be calculated as motions accompanying those of the rigid stick between the both shoulders. Further, by combining or overlapping calculation results of plural motion states, it is possible to generate, for example, linear or dynamic motions alone, and by arbitrarily combining these motions, various other motion states can also be generated.

While this example has been described in connection with the state transition of the arm motion from $q_0$ to $q_1$ and to $q_2$, the same results as mentioned above could be obtained in the case of the state transition in the reverse direction from $q_2$ to $q_1$ and to $q_0$ or in the case of periodic motions as well.

Figure 7:
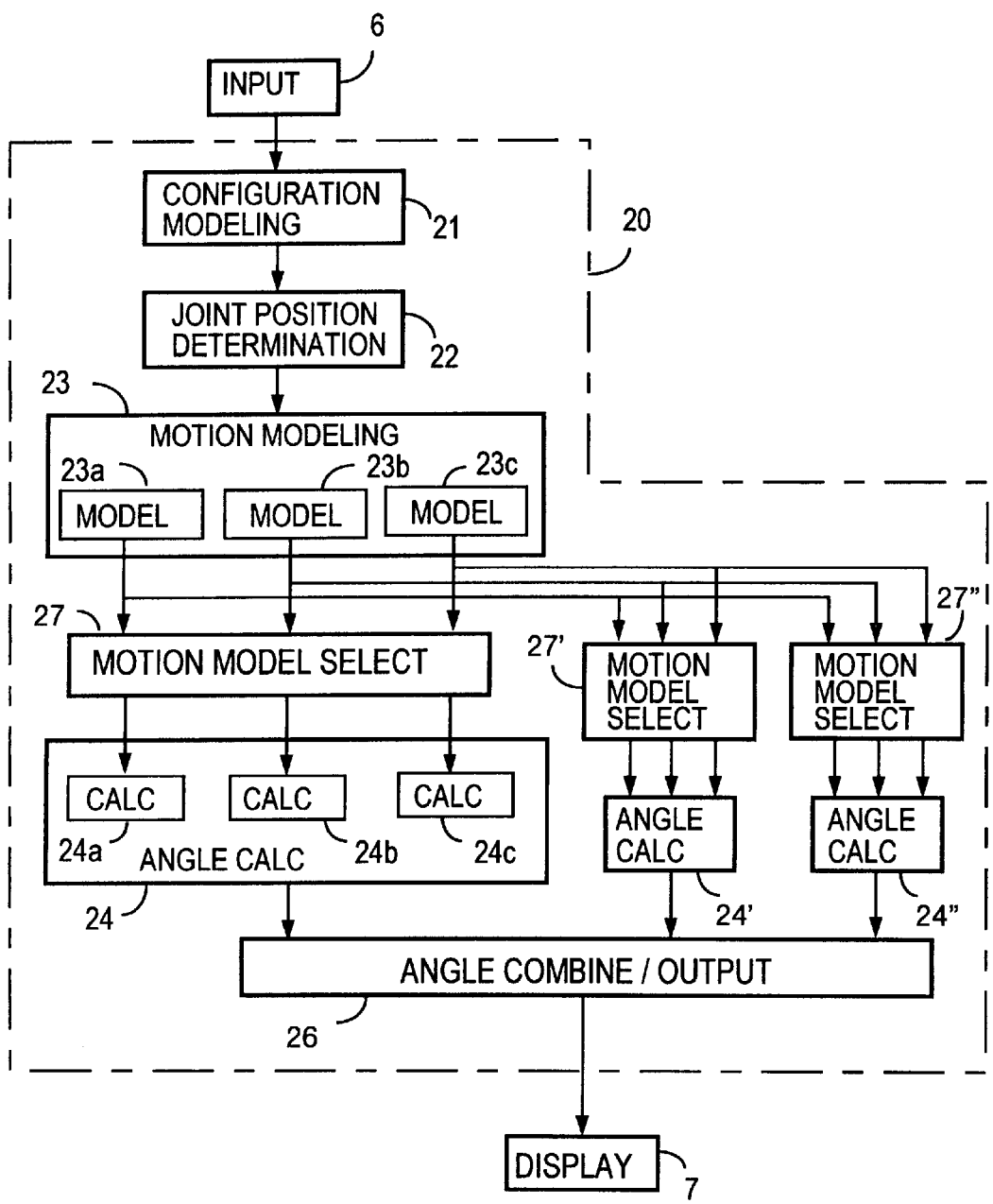
FIG. 7 is a block diagram illustrating still another embodiment of the animation generating apparatus according to the present invention.

In the combining shown by Eqs. (7) and (8), different combinations of motion models for the individual rigid sticks of the multi-articulated structure may also be chosen. In such an instance, by selecting the combinations of motion models in accordance with the accuracy or complexity required for the respective rigid sticks, the computational quantity could efficiently be assigned to each of them. Turning next to FIG. 7, a description will be given of an embodiment which facilitates implementation of such combinations. In this embodiment, for each parameter of the multi-articulated structure modeling the human body, an optimum motion modeling method is selected in accordance with the processing efficiency and/or required reality. To this end, a motion model select part 27 is interposed between the motion modeling part 23 and the arm angle calculation part 24 to determine which motion modeling scheme (or constant) is used for each rigid stick. Moreover, this embodiment employs plural (three) sets of motion modeling select parts 27 and arm angle calculation parts 24 to prepare plural sets of different combinations of motion modeling schemes for each of the rigid sticks that model the arm, and as required, results of arm angle calculations by different set of such motion modeling schemes are subjected to weighted combining in the combine/output part 26.

The configuration modeling part 21 determines the configuration of the arm as shown in FIG. 4, for instance. That is, the parameters that are designated in this case are the angle of rotation $\delta$ of the shoulder about the axis in the forward direction (indicating rocking of the shoulder), the angle of rotation $\theta$ of the shoulder about the axis in the vertical direction, the angle of rotation p of the constraint plane $15_1$ containing the upper arm from the vertical plane (indicating the angle between the upper arm and the side of the human figure under the armpit), the angle $\phi_1$ of the upper arm $12_1$ in the constraint plane $15_1$, the angle of rotation $\xi$ of the constraint plane $15_2$ containing the lower arm $12_2$ about the upper arm $12_1$ and the angle $\phi_2$ of the lower arm $12_2$ in the constraint plane $15_2$, and the reference position O is set at the center of the shoulder in FIG. 4, for instance.

Thereafter, the joint position determination part 22 determines the position of the point O designated to be the origin in FIG. 4. When the configuration modeling part 21 designates the coordinates $(x_0, y_0, z_0)$ of the origin O to be at another point, the joint position determination part 22 determines the that position. For example, when the point O is derivable from the motion of another part of the body, a certain point of that part is connected to the origin O.

After this, the motion modeling part 23 determines procedures of plural motion modeling schemes to be used. While this embodiment employs three kinds of motion modeling schemes, any other schemes may be added.

For example, the motion modeling section 23 utilizes dynamics. In this instance, the afore-mentioned Lagrange's equation of motion (6) for this coordinate system is formulated by a well-known scheme of dynamics. Here, the generalized coordinates q represent $\delta$, $\theta$, $\rho^R$, $\rho^L$, $\phi^R_1$, $\phi^L_1$, $\phi^R_2$, $\phi^L_2$, $\xi^R$ and $\xi^L$, and the generalized force Fq is a torque corresponding to the individual coordinates, the suffixes R and L indicating the right and the left side, respectively. In this case, there exist 10 equations of motion for each coordinate.

For example, the motion modeling section 23b determines the parameter value at each point in time by the linear interpolation scheme. For example, where the values $q_0$ and $q_1$ of a certain motion state parameter q at initial and final points in time $t_0$ and $t_1$ of the motion are already determined, the value at an arbitrary time t (where $t_0 \leq t \leq t_1$) between the initial and final points in time is determined by linear interpolation. The same goes for the case where a value $q_m$ at time $t_m$ (where $t_0 \leq t_m \leq t_1$) is already determined at initial time $t_0$. It is no problem how many such values exist at points between the initial and final ones. Further, the parameters may also take the same value from initial time $t_0$ to final one $t_1$.

For example, the motion modeling section 23c determines the parameter value at each time by such a nonlinear interpolation as a sine function interpolation. As is the case with the modeling section 23b, when the parameter value at a certain point in time is already determined, the value of the parameter q at each time t is determined by such a combination of second- and third-order equations and an elementary that the parameter takes the already value at that time.

Following this, the motion model select part 27 determined the motion state of the arm for which a calculation is actually conducted. For instance:

(a) In the case of conducting dynamic calculations for all parameters, only the motion modeling section 23a is used.

(b) A certain parameter is set at a fixed value and the motion modeling section 23b is used for the other remaining parameters.

(c) A certain parameter is set at a fixed value, the modeling section 23a is used for some of the remaining parameters, the modeling section 23b for some of the other remaining parameters and the modeling section 23c for the remaining parameters.

By this, methods for computing all the parameters are determined.

The arm angle calculation part 24 performs actual angle calculations in the calculating sections 24a, 24b and 24c following the parameter calculating methods determined as described above. In this instance, it is also possible, with a view to providing increased efficiency for the calculation procedure, to conduct calculations at each time in the following order:

(a) Of the parameters handled by the modeling sections 23b and 23, parameters independent on other parameter values are calculated;

(b) Of the parameters handled by the modeling sections 23b and 23, parameters dependent on other parameter values are calculated;

(c) Parameters defined by the modeling section 23a are calculated.

The results calculated in the arm angle calculation part 24 may be used intact as output values, but other combinations of parameter calculating methods can be used. In the embodiment of FIG. 7, there are provided pairs of motion modeling select sections and angle calculation sections 27', 24' and 27", 24" similar to the pair of motion modeling part 27 and angle calculation part 24 so that a combination of motion models to be applied to each rigid stick, different from the combination of motion models selected by the motion model select part 27, is selected and that arm angles are calculated based on the newly selected combination of motion models. The results of angular position calculations by the arm angle position calculating parts 24, 24' and 24" for the rigid sticks respectively corresponding thereto are suitably weighted and combined in the combine/output part 26, from which the combined output is fed to the display part 7. In this case, the angle or angular velocity values at each point in time may also be combined.

This embodiment is advantageous in that the computing time can be reduced as compared in the case of computing all parameters through utilization of dynamics in FIG. 4, for example, and that the value of a particular parameter can be varied arbitrarily or held constant.

While the present invention has been described as being applied to the representation or creation of the motion state of the arm 12, it is evident that the invention is also applicable to the representation of the leg motion of a walking human, for instance.

The animation generating methods of the present invention described previously with reference to FIGS. 2, 5 and 8 are each prestored as animation generating sequences in a memory or similar recording medium and the animation is generated by a computer or DSP following the generating sequences read out of the recording medium.

EFFECT OF THE INVENTION

As described in the above, according to the present invention, since motions of respective rigid sticks connected by joints to form a multi-articulated structure are represented by parameters in a constraint plane for easier recognition of their contribution to the motions, animations can efficiently be generated without any particular skill. Further, the joint is a model approximated by a physical pendulum and the joint motion is represented by an equation of motion formulated for the model—this permits more realistic calculation of motions of the arm joint or the like. Moreover, by using plural motion models and applying an arbitrary motion state to each parameter representing the arm, animations can efficiently be created and the individual parameters can be controlled with ease. Additionally, since angles or angular velocities formed by plural motion states are combined, a variety of motion states can be represented.

It will be apparent that many modifications and variations may be effected without departing from the scope of the novel concepts of the present invention.

What is claimed is:

1. A method for generating animations of the human body including both shoulders and arms modeled by a multi-articulated structure formed by plural rigid sticks connected by joints, said method comprising the steps of:

(a) defining a constraint plane in which said rigid sticks having modeled each of said arms are allowed to move about said joint connecting them;

(b) determining parameters that define angular positions of said rigid sticks in said constraint plane and constructing motion models of said rigid sticks by using said parameters; and (c) generating motions of said rigid sticks having modeled said each arm by calculating temporal changes in said angular positions of said rigid sticks on the bais of said motion models.

2. The method of claim 1, wherein said step (b) includes a step of selectively applying either a motion modeling scheme using laws of physics or a different motion modeling scheme not based on said laws of physics for said parameters defining said angular positions of said rigid sticks.

3. The method of claim 2, wherein there are prepared a plurality of said motion modeling schemes not based on said laws of physics.

4. The method of claims 2 or 3, wherein said step (b) includes a step of constructing plural motion models for said parameters of said rigid sticks and said step (c) includes a step of performing weighted-combining of parameters generated by said plural motion models.

5. The method of claim 4, wherein said weighted-combining is linear weighted-combining.

6. The method of claim 4, wherein said weighted-combining is nonlinear weighted-combining.

7. The method of claim 4, wherein weights of said weighted-combining are changed with time.

8. The method of claims 2 or 3, wherein said step (b) includes a step of approximating said motions of said rigid sticks by a physical pendulum to construct said motion models and formulating equations of motion for said models by said physical pendulum to represent said motions of said rigid sticks.

9. The method of claims 2 or 3, wherein said physical pendulum includes two rigid sticks corresponding to upper and lower arms of said each arm and connected at one end by one joint to each other, one of said rigid sticks having its other end connected to the joint of one of said shoulders.

10. The method of claims 2 or 3, wherein said step (b) includes a step of calculating the position of said joint serving as a fulcrum of said physical pendulum of said rigid sticks and said step (c) includes a step of calculating, by said equations of motion, angular positions or angular velocities representing the configurations of said rigid sticks at a certain point in time.

11. The method of claim 10, wherein said step (b) includes a step of constructing a plurality of different models of said motions of said rigid sticks and said step (c) includes a step of calculating said angular positions or angular velocities of said rigid sticks by using said plurality of different models respectively corresponding thereto and performing weighted-combining of them to represent motion states of said rigid sticks.

12. The method of claim 1, wherein: said step (b) includes a step of approximating said motions of said rigid sticks by a physical pendulum to construct arm models, determining motion modeling equations by applying equations of motion and an interpolation scheme to said arm models, and calculating the position of a joint which serves as a fulcrum of said physical pendulum of each of said arm models; and said step (c) includes a step of calculating, by said motion modeling equations, angular positions or angular velocities representing the configuration of said each arm at a certain point in time and performing weighted combining of said angular positions or angular velocities, thereby representing the motion state of said each arm.

13. The method of claim 12, wherein said step (b) includes a step of determining physical quantities including the lengths, mass, centroids, maximum expansion and bending angles of said upper and lower arms of said each arm for said modeling of motions of said arm models.

14. The method of claim 12, wherein said equations of motion are determined on the assumption that motions of said arm models are motions by models constructed by approximating said joint.

15. The method of claim 12, wherein said equations of motion are overlapped with functions representing preset motions, thereby representing motions of said each arm.

16. The method of claim 12, wherein the step of calculating the position of said joint includes a step of calculating the coordinate value, velocity and acceleration of said joint regarded as a point in a 3D space.

17. The method of claim 12, wherein said weighted-combining is linear weighted-combining.

18. The method of claim 12, wherein said weighted-combining is nonlinear weighted-combining.

19. The method of claim 12, wherein weights of said weighted-combining are changed with time.

20. The method of claim 12, wherein parameters which defines motions of said rigid stick joining said both shoulders include an angle $\theta$ through which said rigid stick is rotated on a vertical coordinate axis passing through the center of said rigid stick joining said both shoulders.

21. The method of claim 20, wherein parameters which defines motions of said rigid stick joining said both shoulders include an angle $\delta$ through which said rigid stick is rotated on a horizontal coordinate axis passing through the center of said rigid stick joining said both shoulders.

22. The method of claim 20, which further includes a step of determining an angle p between said constraint plane containing said rigid sticks modeling said each arm and said vertical coordinate axis in response to centrifugal force caused by the rotation of said both arms resulting from said rotation of said rigid stick on said vertical coordinate axis.

23. An apparatus for generating animations of the human body including both shoulders and arms modeled by a multi-articulated structure formed by plural rigid sticks connected by joints, said apparatus comprising:

configuration modeling means for disposing said rigid sticks in respective constraint planes;

shoulder position calculating means for calculating the position of a joint of each of said shoulder;

motion modeling means for determining motion models representing motions of said rigid sticks; and arm angle calculating means for calculating, for each of said motion models, the angular position of said each arm representing its configuration at a given point in time.

24. The apparatus of claim 23, wherein said motion modeling means includes plural modeling sections for modeling motions of said rigid stick of said each arm with plural different models and said arm angle calculating means includes plural calculating sections for calculating the angular positions or angular velocities of said each arm by using said motion models determined by said plural modeling sections, and which further includes angle combine/output means for performing weighted combining of said plural angular positions or angular velocities calculated by said plural calculating sections of said arm angle calculating means, thereby obtaining the angular position or angular velocity of said each arm.

25. The apparatus of claim 23, wherein said motion modeling means includes plural modeling sections for modeling motions of said rigid stick of said each arm with plural different models and said arm angle calculating means includes plural calculating sections for calculating the angular positions or angular velocities of said each arm by using said motion models determined by said plural modeling sections, and which further includes motion model select means for selectively designating, for each of said rigid sticks, which one of said motion models by said plural modeling sections is to be used to calculate said angular positions.

26. The apparatus of claim 25, which further comprises said motion modeling means and said arm angle calculating means provided in pairs, said motion model select means of said pairs selecting a different combination of motion models for said each rigid stick, and combine/output means whereby angular positions or angular velocities output from said arm angle calculating means of said pairs are subjected to weighted combining for each corresponding rigid stick.

27. The apparatus of claims 24 or 25, wherein said plural motion models include motion models by an equation of motion based on laws of physics and motion models based on an interpolation scheme.

28. The apparatus of claim 27, wherein said motion models based on said interpolation scheme include a motion model of the motion of said each rigid stick by approximating it by a uniform angular velocity motion and using a linear interpolation scheme, a motion model of the motion of said each rigid stick by approximating it by a sine function and using a sine function interpolation scheme, and a motion model of the motion of said each rigid stick by using an equation of motion which obeys laws of physics.

29. The apparatus of claims 24 or 25, wherein said configuration modeling means is means for modeling the motion of said each arm as a physical pendulum with its fulcrum at each of said shoulders.

30. The apparatus of claim 29, wherein said physical pendulum contains two rigid sticks corresponding to upper and lower arms of said each arm and connected at one end by a joint to each other, one of said rigid sticks having its other end connected to the joint of one of said shoulders.

31. The apparatus of claim 23, wherein said motion modeling means is means for modeling the motion of an arm model of said each arm and the motion of a shoulder model of each of said shoulders independently of each other.

32. The apparatus of claim 23, wherein said motion modeling means is means for modeling by overlapping an equation of motion of an arm model of said each arm with a preset function representing a motion.

33. The apparatus of claim 23, wherein said configuration modeling means includes means whereby said rigid stick having modeled said shoulder is modeled so that it rotates at its center lengthwise thereof about a vertical coordinate axis within the range of a predetermined angle $\theta$.

34. The apparatus of claim 23, wherein said configuration modeling means includes means whereby said rigid stick having modeled said shoulder is modeled so that it rotates at its center lengthwise thereof about a horizontal axis within the range of a predetermined angle $\delta$.

35. A recording medium which has recorded therein a procedure for generating animations of the human body including both shoulders and arms modeled by a multi-articulated structure formed by plural rigid sticks connected by joints, said procedure comprising the following sequence of operations of:

(a) defining a constraint plane in which said rigid sticks having modeled each of said arms are allowed to move about said joint connecting them;

(b) determining parameters that define angular positions of said rigid sticks in said constraint plane and constructing motion models of said rigid sticks by using said parameters; and (c) generating motions of said rigid sticks having modeled said each arm by calculating temporal changes of said parameters.

36. The recording medium of claim 35, wherein said operation (b) includes an operation of selectively applying either a motion modeling scheme using laws of physics or a different motion modeling scheme not based on said laws of physics for said parameters defining said angular positions of said rigid sticks.

37. The recording medium of claim 35, wherein: said operation (b) includes an operation of approximating said motions of said rigid sticks by a physical pendulum to construct arm models, determining motion modeling equations by applying equations of motion and an interpolation scheme to said arm models, and calculating the position of a joint which serves as a fulcrum of said physical pendulum of each of said arm models; and said operation (c) includes an operation of calculating, by said motion modeling equations, angular positions or angular velocities representing the configuration of said each arm at a certain point in time and performing weighted combining of said angular positions or angular velocities, thereby representing the motion state of said each arm.

* * * * *